G. P. SPRINGFIELD.
SIGNAL.
APPLICATION FILED JULY 27, 1921.
1,435,749.
Patented Nov. 14, 1922.
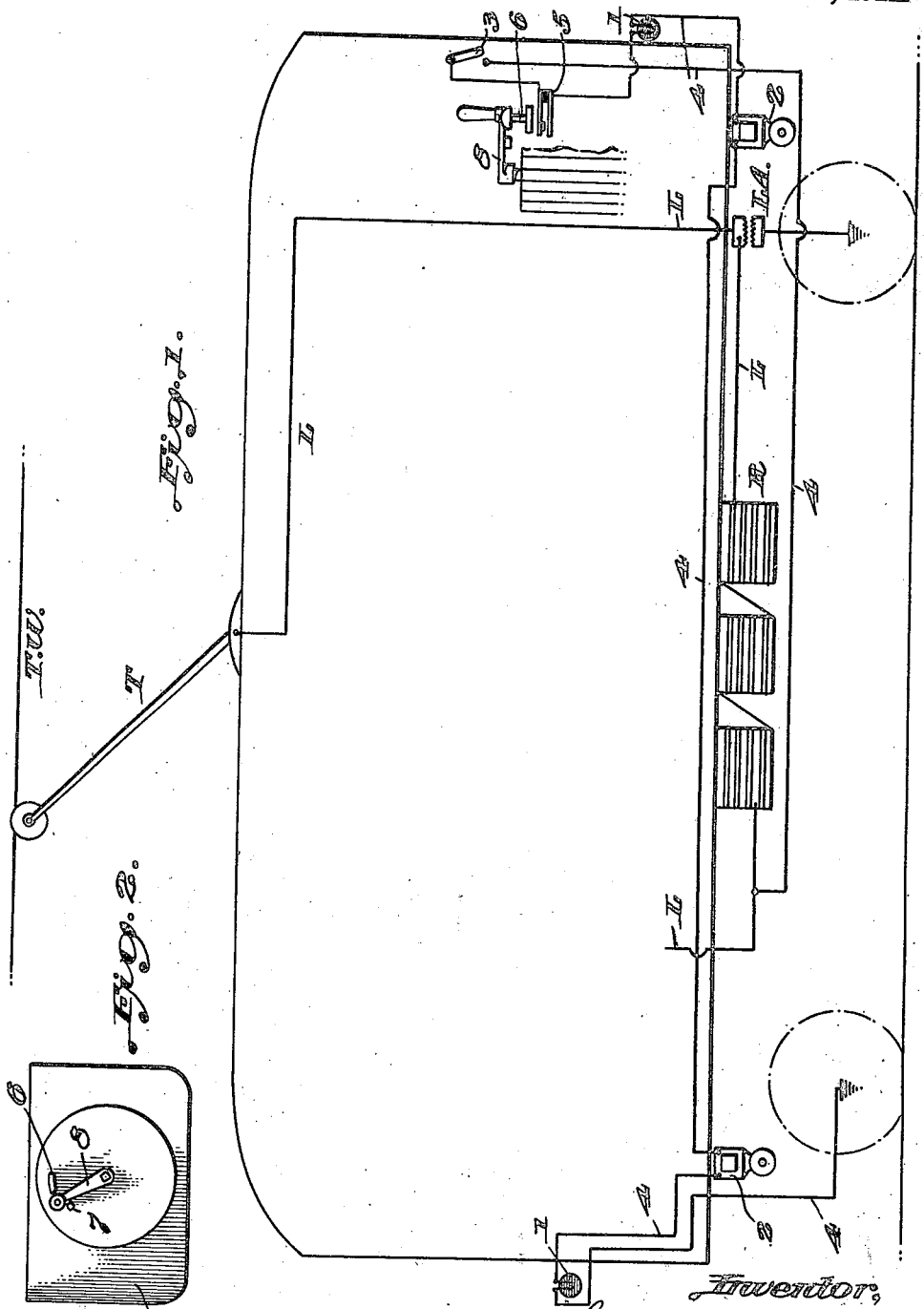

Patented Nov. 14, 1922.

1,435,749

UNITED STATES PATENT OFFICE.

GARLAND P. SPRINGFIELD, OF EVANSVILLE, INDIANA, ASSIGNOR OF ONE-HALF TO OTHO H. BYRUM, OF EVANSVILLE, INDIANA.

SIGNAL.

Application filed July 27, 1921. Serial No. 487,846.

*To all whom it may concern:*

Be it known that I, GARLAND P. SPRINGFIELD, a citizen of the United States, residing at Evansville, in the county of Vanderburgh and State of Indiana, have invented certain new and useful Improvements in Signals, of which the following is a specification.

This invention relates to signals for electric cars.

My object is to provide a signal which will be automatically thrown into operation by the movement of the controller handle just before the controller puts the electric motors of the car into circuit and just after they have been cut out of circuit, whereby the signal will be sounded or displayed, or both sounded and displayed, just before the car starts and just as it is about to stop.

My invention has the advantage of automatically signalling, either visually or audibly, or both, to pedestrians or those in automobiles or other vehicles the conditions surrounding the movement of the car so that others will govern themselves accordingly.

While it is possible with my invention for the motorman to operate the signal manually, the main purpose is to provide a signal whose action will be automatically controlled by the movement of the handle of the controller for the electric car.

I wish it understood that the electric signal may be a visual signal alone; an audible signal alone; or, a combination of visual and audible signals, which latter arrangement is described hereinafter and shown in the accompanying drawings, in which:

Figure 1 is a diagrammatic side elevation showing the invention applied to an electric car which is shown in outline; and Fig. 2 is a plan view of the controller, showing the location of the depressible button with which the controller handle cooperates.

At the outset, I wish it understood that while I have shown a certain general circuit arrangement whereby the current is taken from the trolley wire, this is to be considered merely as illustrative and the same is true of the lightning arrester, and resistance. Furthermore, the exact location of the signal lights and the electric bells or other audible electric signals is not necessarily that disclosed in the drawing.

My invention bears no relationship to the electric wiring of the car nor to the control of the car by the controller. The illustration in connection with the car wiring is merely to show how current may be derived from some suitable point of the car circuit. It is within the spirit of my invention to utilize primary or secondary batteries for the circuit of the signals representing my invention. The interrelation of the controller of the car with the switch of my signal system is purely a mechanical one.

The trolley wire appears at T W; the trolley at T; the main lead is shown at L; the lightning arrester appears at L, A; the resistance boxes are shown at R, and the controller box appears at C.

I provide electric lights 1 at the ends of the car and electric bells 2 at the ends of the car, disposed in any suitable or preferred manner. At some suitable point there is provided a hand switch 3 by which the circuit of the signals 1 and 2 may be broken whenever necessary or desirable.

The circuit 4 which includes the signals 1 and 2 may be grounded on the wheels of the car. If a battery is used, the circuit may be complete or a return wire circuit, as will be well understood.

Suitably arranged inside the controller box C or disposed in relation thereto so as to be operable is a normally open switch 5 of any desired form or construction. A depressible button 6 is adapted to cooperate with one leaf or contact of switch 5 so that when said button is depressed it will bring the contacts of the switch 5 together and complete the circuit 4, assuming that the switch 3 is closed, thus effecting illumination of the lights 1 and sounding the bells 2. The lights 1 may be colored red, if desired, to distinguish them from the usual headlight and other lights of the car.

The button 6 is arranged between the lug or stop 7 representing the dead point of the controller, and the first running point thereof and is positioned to lie in the path of the controller handle 8. Consequently when the motorman moves the controller handle 8 from the dead point toward the first running point, said handle engages the button 6 and depresses it before the first running point is reached. Consequently the signals 1 are illuminated and signals 2 sounded before the car starts. Similarly, when a car is being brought to a stop, as the controller handle 8 is turned backwardly or in a counterclockwise direction, Fig. 2, after it has passed the first running point, it engages the button 6 just before the controller handle comes to the dead point. Therefore, just as the car is stopping the signal lights 1 and the bells 2 come into action.

It is possible for the motorman to manually depress the button 6 if he desires to sound the signals 2 and display signals 1 which might be the case when he had his controller handle 8 all the way around in running position while the car was going up a heavy grade. I am aware that modifications may be resorted to in carrying out my invention and the disclosure thereof is to be considered as illustrative rather than restrictive of the scope of the invention.

In the circuit arrangement illustrated and previously described, when the switches 3 and 5 are closed, the circuits may be traced as follows—from trolley wire T. W., through trolley T, lead L, resistances R, circuit 4, switch 3, push button switch 5, signal light 1, bell 2, return branch of circuit 4, bell 2, return branch 4, signal light 1, circuit 4 to ground on axle of car wheel.

What I claim is:

A signal for an electric car having a power controller provided with an operating handle, comprising an electrically operated signaling device, an exposed switch arranged to be operated by the handle of the power controller only when said handle is part way between the "dead" and the first running point of the controller, and circuit connections including the switch and signal whereby said signal will be operated only when the handle is engaged with the switch, said switch enabling the motorman to manually operate it at any time regardless of the position of the operating handle.

In testimony whereof I affix my signature.

GARLAND P. SPRINGFIELD.